July 22, 1958   H. G. STIRM ET AL   2,844,264
APPARATUS FOR HANDLING SHORTENING OR LIKE MATERIAL
Filed March 4, 1953   5 Sheets-Sheet 1

INVENTORS
HENRY GLENN STIRM
ROBERT WOLCOTT SMITH
EDWARD BEAM STIRM
By Bruce & Brosler
THEIR ATTORNEYS July 22, 1958     H. G. STIRM ET AL     2,844,264
APPARATUS FOR HANDLING SHORTENING OR LIKE MATERIAL
Filed March 4, 1953     5 Sheets-Sheet 2
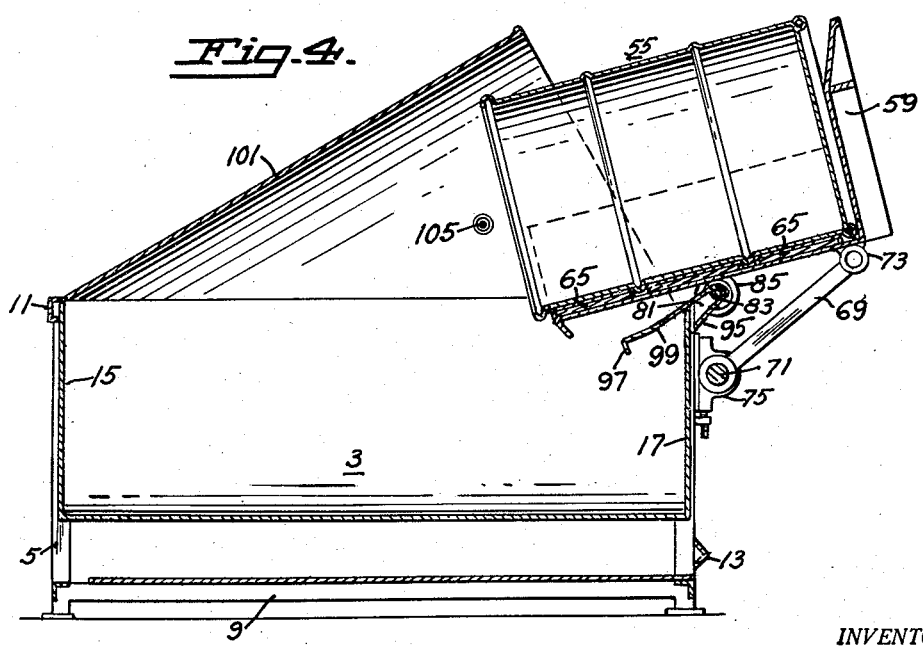
INVENTORS
HENRY GLENN STIRM
ROBERT WOLCOTT SMITH
EDWARD BEAM STIRM
By Bruce & Brosler
THEIR ATTORNEYS

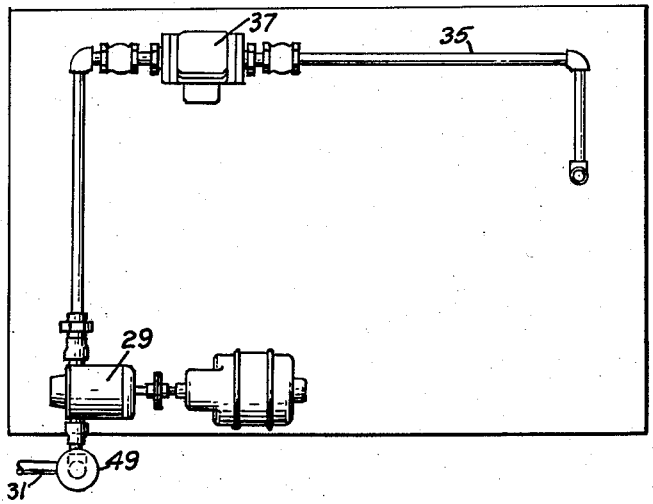
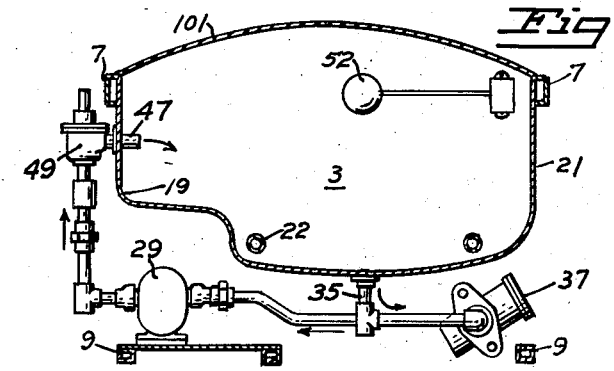
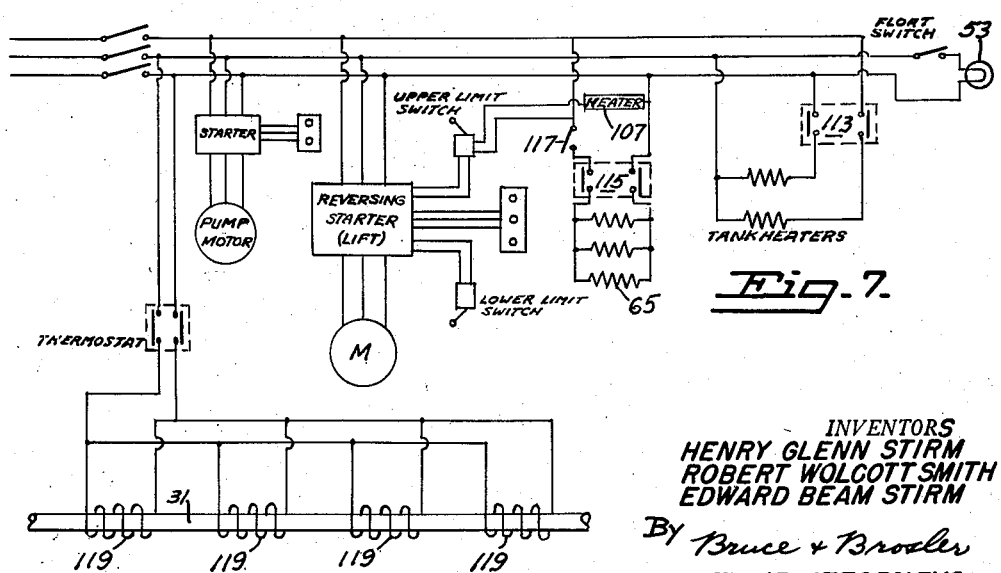

July 22, 1958   H. G. STIRM ET AL   2,844,264
APPARATUS FOR HANDLING SHORTENING OR LIKE MATERIAL
Filed March 4, 1953   5 Sheets-Sheet 4

INVENTORS
HENRY GLENN STIRM
ROBERT WOLCOTT SMITH
EDWARD BEAM STIRM
BY *Bruce & Brosler*
THEIR ATTORNEYS July 22, 1958    H. G. STIRM ET AL    2,844,264
APPARATUS FOR HANDLING SHORTENING OR LIKE MATERIAL
Filed March 4, 1953    5 Sheets-Sheet 5
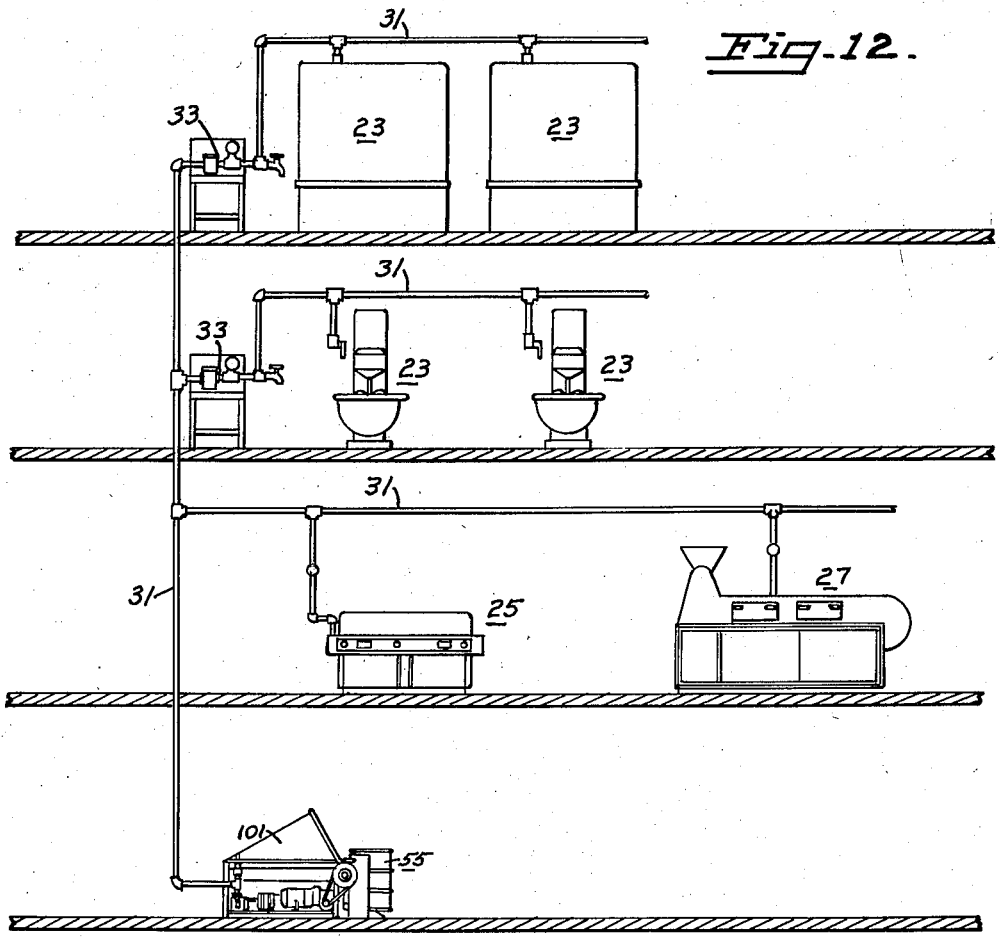
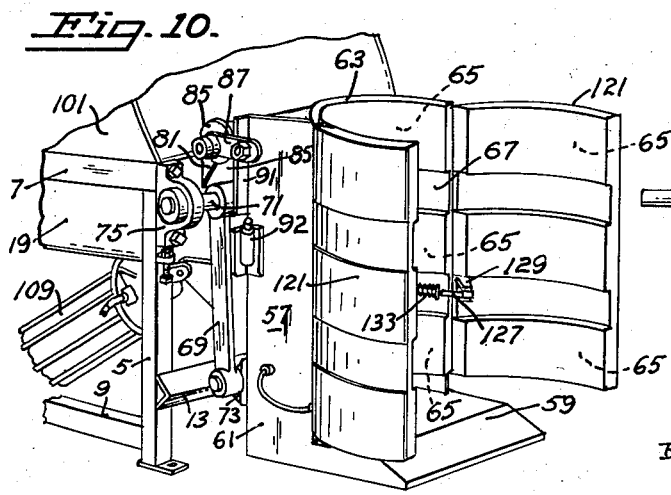
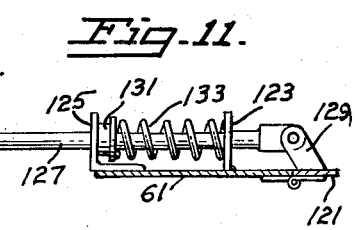
INVENTORS
HENRY GLENN STIRM
ROBERT WOLCOTT SMITH
EDWARD BEAM STIRM
By Bruce & Brosler
THEIR ATTORNEYS United States Patent Office 2,844,264
Patented July 22, 1958

2,844,264

APPARATUS FOR HANDLING SHORTENING OR LIKE MATERIAL

Henry Glenn Stirm, San Mateo, Robert Wolcott Smith, San Carlos, and Edward Beam Stirm, Palo Alto, Calif., assignors to Ferry Sheet Metal Works, Inc., San Francisco, Calif., a corporation of California Application March 4, 1953, Serial No. 340,346

12 Claims. (Cl. 214—314)

Our invention relates to the handling of material such as shortening in the production of bakery products on a large scale, and more particularly to a method and apparatus employable in the handling of such material.

In accordance with prevailing practice, in bakeries operating on a large scale, shortening is scooped from drums and weighed out in batches of the desired quantity in accordance with the requirements of utilization equipment such as dough mixers, pan greasers, or doughnut machines, to which shortening is normally supplied.

Among the objects of the present invention are:

(1) To provide a novel and improved method and apparatus for handling material such as shortening;

(2) To provide a novel and improved method and apparatus for handling material such as shortening and the like, in a manner which results in considerable saving of labor over the prevailing practice indicated above;

(3) To provide a novel and improved method and apparatus for handling of material such as shortening and the like, which permits of more accurate measurement of such material in desired amounts;

(4) To provide a novel and improved method and apparatus for handling of material such as shortening or the like, which is highly sanitary and eliminates opportunities for contamination of the material;

(5) To provide a novel and improved method and apparatus for the handling of materials such as shortening or the like, which method and apparatus is considerably faster in the accomplishment of results than prior practice;

(6) To provide a novel and improved method and apparatus for the handling of materials such as shortening and the like, which eliminates waste in the handling of such material;

Additional objects of our invention will be brought out in the following description of a preferred embodiment and modifications of the same, taken in conjunction with the accompanying drawings wherein Figure 1 is a three-dimensional view of the apparatus constituting an important factor in the present invention;

Figure 3 is a side view in elevation, partly broken away, of the apparatus of Figure 1;

Figure 4 is a view in section of the apparatus of Figure 1, depicting the same in operation;

Figure 5 is a plan view depicting that part of a pumping system incorporated in the apparatus of Figure 1, and involved in the present invention;

Figure 6 is a view in elevation of that part of the pumping system depicted in Figure 5, and showing its relationship to the apparatus in which it is incorporated;

Figure 7 is an electrical circuit associated with the apparatus of Figure 1, for controlling the operation thereof;

Figure 10 is a three-dimensional view of a modified form of carriage embodied in the aforementioned apparatus;

Figure 11 is a view depicting the mode of operation of the improved carriage of Figure 10;

Figure 12 is a view depicting the application of the method and apparatus of the present invention to a bakery set up.

Figure 1:
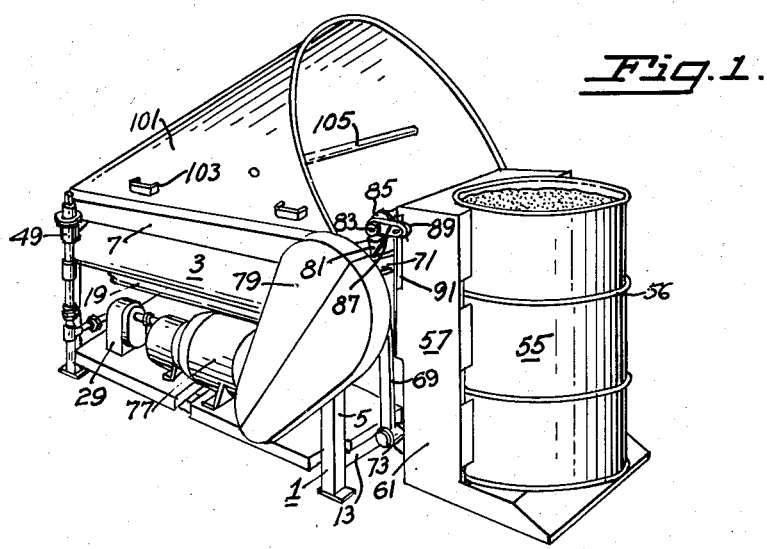
Figure 2:
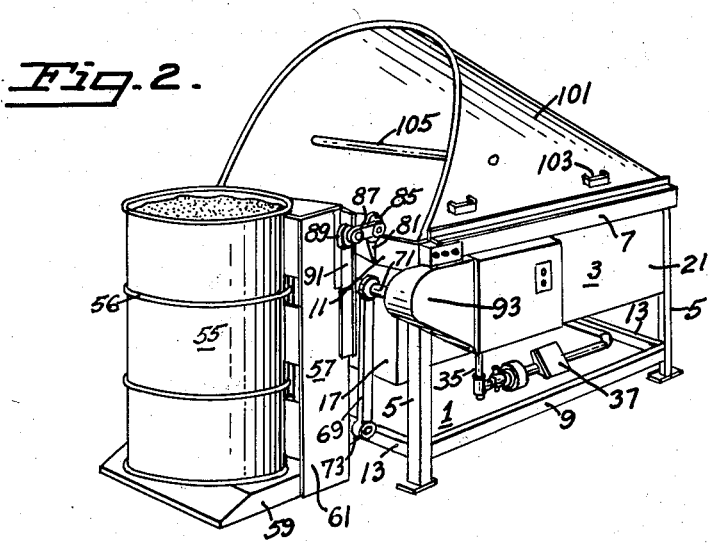
Figure 2 is a three-dimensional view of the apparatus of Figure 1, looking at it from the opposite side.
Figure 8:
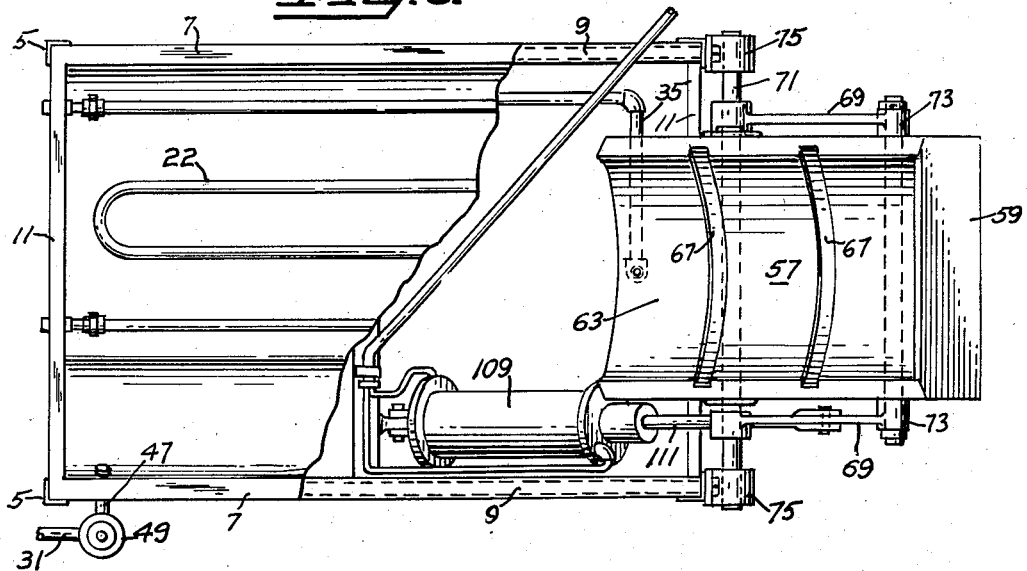
Figure 8 is a fragmentary view of apparatus similar to that of Figure 1, but depicting the application of compressed air to the operation thereof.
Figure 9:
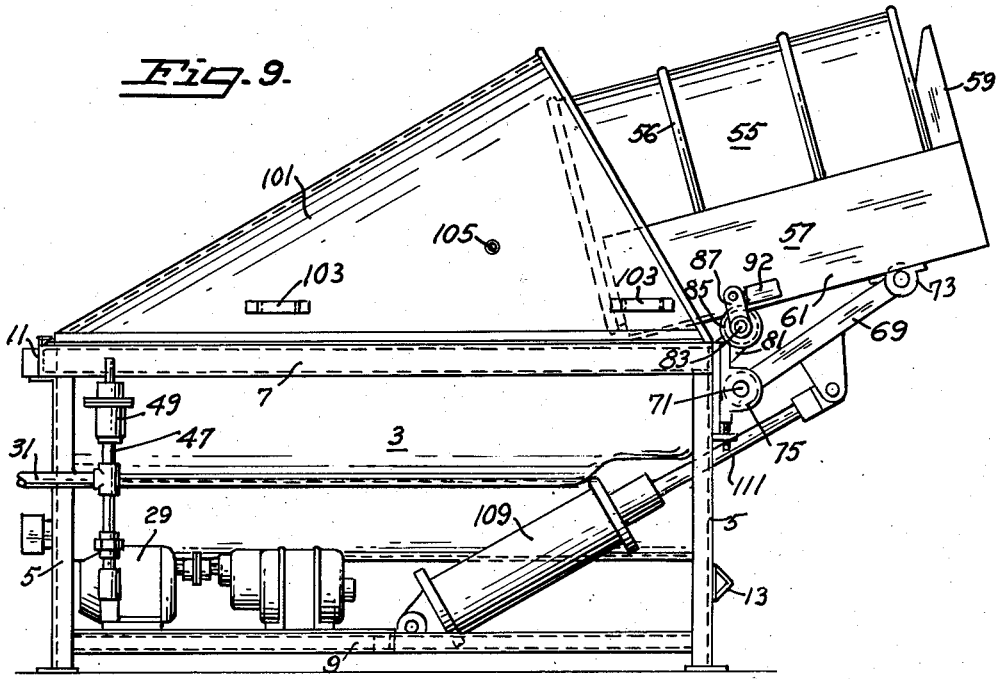
Figure 9 is a side elevational view depicting the apparatus of Figure 8 in operation.

Referring to the drawings for details of construction of apparatus involved in our invention, the apparatus of Figure 1 and related figures involves a tank assembly comprising a frame 1 and tank 3 supported thereby.

The frame comprises upright corner members 5 interconnected by upper and lower side frame members 7 and 9 respectively, and upper and lower cross members 11 and 13 respectively, at the front and rear end of the frame.

Within the frame is suspended the tank having end walls 15, 17 and side walls 19, 21, the side wall 19 being preferably formed with an offset to provide space below for associated operating equipment.

The tank is designed to hold liquid. In the particular instance under consideration, such liquid contents will be shortening in a liquid state, where it will be maintained in such state by heating means, such as a steam coil or pipe arrangement 22 disposed in the bottom of the tank and connectible to a source of steam supply through an end wall of the tank.

In its liquid state, it is pumped to utilization equipment such as dough mixers 23, pan greasers 25, doughnut machines 27, or the like. For this purpose a circulating pump 29 supported within the frame below the offset in the side wall of the tank is pipe connected through liquid meters 33 to such equipment, the connecting pipes 31 being heated to maintain and assure free flow of the shortening.

An outlet connection 35 at a low point in the tank, leads to the suction or intake end of the circulating pump, such outlet connection including a strainer 37 for the liquefied material flowing from the tank.

A branch line 47 from the discharge side of the pump and leading back to the tank, includes a pressure relief valve 49, adjusted to open at a pressure slightly in excess of the normal range of pressures developed when supplying the aforementioned equipment, whereby when the pressure on the discharge side of the pump exceeds such range of values, as will occur when flow to the utilization equipment is shut off, said valve will open and divert the liquefied shortening back. Thus under this condition, the liquid contents of the tank will be maintained in a constant state of circulation, which in the case of shortening, is of considerable importance in inhibiting the same from becoming carbonized.

A suitable float valve 52 mounted on a wall of the tank and adapted to respond to the liquid level of the contents in the tank, is connected to an indicator 53 suitably placed for informing an attendant when the level in the tank reaches a predetermined low point indicative of the necessity of adding material to the tank to bring the level up.

If electrical heating is resorted to, the same may take the form of one or more heating elements inserted through the end wall of the tank.

Shortening of course, is solid at normal room temperatures and is conventionally packed in drums 55, comparable in appearance to oil drums, the cylindrical wall of which is formed with spaced ridges 56 for reinforcing purposes. While the shortening might be scooped directly from such drum, and discharged from the scoop into the tank, such routine is necessarily slow, messy and inconvenient, besides opening the way to contamination of the material. Further, the tendency of shortening to adhere to the drum wall makes it difficult to remove the entire contents of the drum, thus necessitating substantial waste.

We have greatly facilitated the tank loading procedure, and with attendant advantages, by removing the adhesion of the shortening to the drum wall through the application of heat to the drum, and then dumping the entire contents directly from the drum into the tank. This procedure is accomplished through means of loading apparatus disposed adjacent an end of the tank assembly and adapted to fulfill the aforementioned functions.

Involved in this loading apparatus, is a carriage 57 for receiving and holding the drum. This carriage comprises a platform 59 flanked by side walls 61 connected by an arcuate wall 63 conforming to the curvature of the drum. Included with this arcuate wall are a plurality of heater units 65 disposed in vertical spaced relationship, with the intermediate spaces 67 at elevations corresponding to the reinforcing ridges on the drums.

The carriage is raised to its dumping position by a pair of actuated carriage lift levers 69. Each such lift lever extends from a hinge shaft 71 at one end to a hinge conection 73 on the carriage adjacent the lower end thereof. The hinge shaft is preferably supported in spaced brackets 75 which are affixed to the proximate corner upright members of the tank frame. Angular rotation of the hinge shaft will swing the lift levers about the axis thereof and cause lifting of the carriage.

In the embodiment of the invention illustrated in Figure 1, the shaft is journaled in the brackets and the levers are pinned or otherwise fixed to the shaft for rotation therewith. Angular rotation of the hinge shaft and consequently the lift levers, is accomplished by the use of an electrical lift motor 77 supported within the framework, below the offset in the side wall of the tank and connected to the hinge shaft by a chain and sprocket connection 79.

To assure that the carriage shall be in proper dumping position when the lift levers have reached their upper limit of swing, guide means are employed to control movement of the upper end of the carriage to a point over the tank, where a drum disposed in the carriage, may dump its contents with assurance against spilling the same outside the tank walls.

A pair of upwardly directed brackets 81 mounted on the nearby upper cross member of the frame, carry an interconnecting bar 83 which extends through and beyond each of said brackets. On each extended portion, is placed a roller 85 and adjacent thereto is a rotatably mounted link 87 at the free end of which, is a smaller roller 89 in the plane of the first roller to constitute a set of rollers.

Along each of the side walls of the carriage is a guide flange 91 adapted to slidably fit between the two rollers of a set, and as the carriage is raised by the lift levers, the angle of tilt of the carriage will gradually change to its dumping angle while the carriage itself is guided to its final dumping position over the tank, all by the time the platform of the carriage reaches its proper elevation for dumping.

A bumper 92 disposed at the lower end of one or both of the guide flanges in position to abut the rollers at the proper moment may be relied on to absorb the shock of stopping the movement of the carriage.

Upper and lower limit switches of conventional construction may be housed in a casing 93 in line with and actuated by the angular movement of the hinge shaft 71 to fix both the upper and lower positions of the carriage.

A sheet metal covering 95 spanning the brackets 81 and enclosing the space therebetween, extends for a short distance into the tank where it terminates in a downwardly turned lip 97 and forms a spill apron 99 to catch drippings from the drum and guide the same into the tank.

Protecting the tank from above, is a hood type cover 101, formed to provide an arched opening at the carriage end to allow for movement of the carriage to its dumping position, such cover tapering down to the upper cross member at the opposite end of the tank frame. Handles 103 provided on the sides of this cover permit of its removal when cleaning or servicing of the tank becomes desirable. Such cover would also serve to intercept and prevent splashing of liquid from the tank, upon dumping of the contents of a drum therein.

We have, however, materially reduced the probability of splashing under such circumstances, by taking advantage of the fact that the contents of the drum during dumping, is still in its solid state. Mounted in the cover transversely thereof, and at a location where it crosses the discharge opening of the drum when in its dumping position, is a bar or rod 105. The solid contents of the drum, in the process of being discharged therefrom, will abut against this rod and its progress, in the absence of any other provision, would be halted. This rod, however, is heated, as by the inclusion of an electrical heating element 107, and will thus cause the bar to melt the mass in immediate contact therewith, and thus permit the contents of the drum to continue its discharge movement, but at a much slower pace. The heated bar thus serves as a brake, in determining the rate at which the mass of shortening may be permitting to discharge into the tank, and by thus slowing the discharge, the material may be eased into the tank and thereby minimize splash.

In lieu of reliance upon an electrical motor for operating the carriage lift mechanism, we propose in the alternative, to employ compressed air means in the form of a cylinder 109 hingedly anchored to a frame member, and having pipe connection to a source (not shown) of compressed air, for actuating a piston having a piston rod 111 connecting to one of the lift levers at an intermediate point thereon. Any conventional or suitable means may be employed to close off the supply of compressed air to the cylinder when the carriage has reached its ultimate dumping position.

In Figure 7 of the drawing, we have depicted an electrical circuit diagram, employable in connection with the equipment described above and particularly that of Figure 1, when the heating elements employed in the tank are electrical in character. The system is designed for operation off a three phase power circuit and accordingly the electrical motors are of the three phase type, the lift motor being capable of reversing. Conventional push-button control circuits and limit switches may be employed in connection with operation of these motors.

The heating units within the tank are connected through a suitable thermostat 113 to the power lines, while the heating units embodied in the carriage, are likewise connected through a suitable thermostat 115, such connection also including a mercoid switch 117.

The switch connected in circuit with the lift motor to determine the upper limit of travel of the carriage, is also connected in circuit with the brake bar 105 and serves in connection with this component to energize the same and cause it to heat up when the carriage is in its dumping position.

When steam pipes or coils are employed in the tank in lieu of electrical heating means, the heater units symbolized in the wiring diagram for tank use, will be eliminated from the circuit, and likewise, when compressed air is employed in the operation of the carriage lift, that portion of the electrical wiring diagram relating to the lift motor will also be eliminated from the electrical system embodied in the apparatus.

The pipes leading from the pump to the utilization equipment, will, as previously indicated, be heated to preclude solidification of the shortening as it travels toward the apparatus in which it is to be utilized. Electrically, such heating means may be described as a plurality of sections 119 of heating cable wrapped around the pipes and connected in parallel to the power lines through suitable thermostat control means.

In Figures 10 and 11, we have depicted an improved carriage construction, one which is adapted to more effectively apply heat to a drum. The improvement resides in adding a pair of wing sections 121 to the carriage previously described and providing for automatic opening and closing of such sections as the carriage approaches and departs from its down position.

To accomplish the foregoing, we hinge each wing section to an adge of one of the carriage side walls 61. On each of the interior surfaces of a side wall, are mounted a pair of spaced mounting plates 123, 125 having openings to slidably receive a control rod 127. On the associated wing section is a laterally extending hinge arm 129, to which one end of the control rod is hinged. Each rod is of a length to engage some point on the tank assembly when the carriage is in its down position and the wing sections are wide open.

Mounted on each rod, at a point between the mounting plates, is a stop 131, and between said stop and the mounting plate closest to the hinge arm, is a coil spring 133 under compression.

It will be apparent from the foregoing that, in the down position of the carriage, the wing sections will be wide open and maintained so against the action of the spring, due to engagement of the control rods with the tank assembly. However, as such engagement is broken, during lifting of the carriage, the springs will be free to take over and force a retraction of the control rods and a consequent closing of the wing sections.

Each wing section will include spaced heated units like the arcuate wall of the carriage as previously described, and accordingly, when the wing sections close about a drum in the carriage, the applied heat will be uniformly distributed about the drum and thus more effectively applied.

From the foregoing description of our invention, it will be apparent that the method and apparatus described fulfill all the objects attributed thereto, and while we have disclosed the same in considerable detail, it will be apparent that the invention is subject to alteration and modification without departing from the basic principles involved and we accordingly do not desire to be limited in our protection to the precise method described and the details of construction illustrated and referred to in connection with the drawings, except as may be necessitated by the appended claims.

We claim:

1. In combination a tank assembly involving a frame and a tank supported within said frame; means for emptying the contents of a container into said tank, said means including a carriage disposed adjacent an end of said tank assembly for holding a container to be emptied, means for lifting said carriage to a dumping position with respect to said tank, said means including a pair of brackets on the adjacent end of said frame, a shaft supported in said brackets, a pair of lift levers, each extending from said shaft and hingedly secured to said carriage adjacent the lower end thereof, power means for angularly swinging said lift levers about the axis of said shaft to raise said carriage to an elevated position, means for simultaneously guiding the upper end of said carriage to a position over said tank and at the same time cause tilting of said carriage, said means including a bar mounted on said frame above and parallel to said shaft, a roller on and adjacent each end of said bar, a short link rotatably mounted on said bar adjacent each of said rollers, a roller carried by each of said links in the plane of the adjacent roller to form a set of guide rollers, a lateral guide flange on each side of said carriage, each of said flanges being slidably disposed between the rollers of one of said sets, and means for halting upward movement of said carriage when it has reached its desired dumping position.

2. In combination, a tank assembly involving a frame, a tank supported within said frame, means for emptying the contents of a container into said tank when such contents is of the nature of shortening or the like, said means including a carriage disposed adjacent an end of said tank assembly for holding a container to be emptied, heating means included in said carriage and adapted, when energized, to heat the walls of a container, held therein, means for lifting said carriage to a dumping position with respect to said tank, and a heatable bar disposed across the discharge opening of a container when supported by said carriage in dumping position.

3. In combination a tank assembly involving a frame and a tank supported within said frame; means for emptying the contents of a container into said tank, said means including a carriage disposed adjacent an end of said tank assembly for holding a container to be emptied, said carriage involving a platform, side walls and an arcuate wall between said side walls, means for lifting said carriage to a dumping position with respect to said tank, said means including a pair of brackets on the adjacent end of said frame, a shaft journalled in said brackets, a pair of lift levers each extending from said shaft and hingedly secured to said carriage adjacent the lower end thereof, a lift motor supported on said frame, and a drive connection between said motor and said shaft to cause rotation of said shaft in response to energization of said lift motor and raise said carriage to an elevated position, means for simultaneously guiding the upper end of said carriage to a position over said tank and at the same time cause tilting of said carriage, said means including a bar mounted on said frame above and parallel to said shaft a roller on and adjacent each end of said bar, a short link rotatably mounted on said bar adjacent each of said rollers, a roller carried by each of said links in the plane of the adjacent roller to form a set of guide rollers, a lateral guide flange on each of said carriage side walls, each of said flanges being slidably disposed between the rollers of one of said sets, and means for halting upward movement of said carriage when it has reached its desired dumping position.

4. In combination, a tank assembly involving a frame, a tank supported within said frame, a hood type cover spanning said tank, means for emptying the contents of a container into said tank when such contents is of the nature of shortening or the like, said means including a carriage disposed adjacent an end of said tank assembly for holding a container to be emptied, heating means included in said carriage and adapted, when energized, to heat the walls of a container held therein, means for lifting said carriage to a dumping position with respect to said tank, and a heatable bar disposed transversely of said cover across the discharge opening of a container when supported by said carriage in dumping position.

5. Means for emptying material such as shortening from a container, comprising a frame, a carriage for holding a container to be emptied, said carriage being disposed adjacent said frame and involving a platform, side walls and an arcuate wall between said side walls, heating means included with said arcuate wall, means for lifting said carriage to a dumping position, said means including a pair of brackets on said frame, a shaft supported in said brackets, a pair of lift levers each extending from said shaft and hingedly secured to said carriage adjacent the lower end thereof, a lift motor supported on said frame, and a drive connection between said motor and said lift levers to raise said carriage to an elevated position; means for simultaneously tilting said carriage; and means for halting upward movement of said carriage when it has reached its desired dumping position.

6. In combination a tank assembly involving a frame and a tank supported within said frame; means for emptying the contents of a container into said tank, said means including a carriage disposed adjacent an end of said tank assembly for holding a container to be emptied, means for lifting said carriage to a dumping position with respect to said tank, said means including a pair of brackets on the adjacent end of said frame, a shaft supported in said brackets, a pair of lift levers each extending from said shaft and hingedly secured to said carriage adjacent the lower end thereof, a lift motor supported on said frame, and a drive connection between said motor and said levers to cause an angular swing of said levers about the axis of said shaft to raise said carriage to an elevated position, means for simultaneously guiding the upper end of said carriage to a position over said tank and at the same time cause tilting of said carriage, and means for halting upward movement of said carriage when it has reached its desired dumping position, departing from the down position of said carriage, said means comprising a pair of spaced mounting plates on each of said carriage side walls, each pair of plates having aligned openings to permit of slidably mounting a control rod therethrough, a hinge arm extending laterally from each wing section and terminating in substantial alignment with the openings in the associated mounting plates, a control rod passing through the aligned openings of each pair of plates and hingedly connecting at one end to the associated hinge arm, each of said rods being of sufficient length to engage said tank frame with said carriage in its down position and with said wing sections wide open, a fixed stop on each of said rods at an intermediate point between its mounting plates, and a spring under compression on each of said rods between such stop and that mounting plate closest to the hinge arm.

7. In combination, a tank assembly involving a frame, a tank supported within said frame, a hood type cover spanning said tank, means for emptying the contents of a container into said tank when such contents is of the nature of shortening or the like, said means including a carriage disposed adjacent an end of said tank assembly for holding a container to be emptied, a plurality of heater units included in said carriage and adapted, when energized, to heat the walls of a container held therein, means for lifting said carriage to a dumping position with the respect to said tank, and a heatable bar disposed transversely of said cover across the discharge opening of a container when supported by said carriage in dumping position.

8. Means for emptying material such as shortening from a container, comprising a frame, a carriage for holding a container to be emptied, said carriage being disposed adjacent said frame and involving a platform, side walls, and a pair of arcuate wing wall sections, each hingedly secured to one of said side walls and including heater units, means for lifting said carriage to a dumping position, said means including a pair of lift levers each hingedly secured at one end to said frame and at its other end to said carriage adjacent the lower end thereof, a lift motor supported on said frame, and a drive connection between said motor and said lift levers to raise said carriage to an elevated position; means for simultaneously tilting said carriage; means for halting upward movement of said carriage when it has reached its desired dumping position; and means for automatically opening and closing the wing sections of said carriage when respectively approaching toward and departing from the down position of said carriage.

9. In combination a tank assembly involving a frame and a tank supported within said frame; means for emptying the contents of a container into said tank, said means including a carriage disposed adjacent an end of said tank assembly for holding a container to be emptied, said carriage involving a platform, side walls and an arcuate wall between said side walls, a pair of arcuate wing wall sections, each hingedly secured to an edge of one of said side walls, means for lifting said carriage to a dumping position with respect to said tank, said means including a pair of brackets on the adjacent end of said frame, a shaft journalled in said brackets, a pair of lift levers each extending from said shaft and hingedly secured to said carriage adjacent the lower end thereof, a lift motor supported on said frame, and a drive connection between said motor and said shaft to cause rotation of said shaft in response to energization of said lift motor and raise said carriage to an elevated position, means for simultaneously guiding the upper end of said carriage to a position over said tank and at the same time cause tilting of said carriage, said means including a bar mounted on said frame above and parallel to said shaft, a roller on and adjacent each end of said bar, a short link rotatably mounted on said bar adjacent each of said rollers, a roller carried by each of said links in the plane of the adjacent roller to form a set of guide rollers, a lateral guide flange on each of said carriage side walls, each of said flanges being slidably disposed between the rollers of one of said sets, means for halting upward movement of said carriage when it has reached its desired dumping position, means for automatically opening and closing the wing sections of said carriage when respectively approaching toward and departing from the down position of said carriage, said means comprising a pair of spaced mounting plates on each of said carriage side walls, each pair of plates having aligned openings to permit of slidably mounting a control rod therethrough, a hinge arm extending laterally from each wing section and terminating in substantial alignment with the openings in the associated mounting plates, a control rod passing through the aligned openings of each pair of plates and hingedly connecting at one end to the associated hinge arm, each of said rods being of sufficient length to engage said tank frame with said carriage in its down position and with said wing sections wide open, a fixed stop on each of said rods at an intermediate point between its mounting plates, and a spring under compression on each of said rods between such stop and that mounting plate closest to the hinge arm.

10. Means for emptying material such as shortening from a container, comprising a frame, a carriage for holding a container to be emptied, said carriage being disposed adjacent said frame and involving a platform, side walls and an arcuate wall between said side walls, a plurality of heater units included with said arcuate wall, a pair of arcuate wing wall sections, each hingedly secured to one of said side walls and including a plurality of heater units, means for lifting said carriage to a dumping position, said means including a pair of brackets on said frame, a shaft supported in said brackets, a pair of lift levers each extending from said shaft and hingedly secured to said carriage adjacent the lower end thereof, a lift motor supported on said frame, and a chain and sprocket connection between said motor and said shaft to cause rotation of said shaft in response to energization of said lift motor and raise said carriage to an elevated position; means for simultaneously tilting said carriage, said means including a bar mounted on said frame above and parallel to said shaft, a roller on and adjacent each end of said bar, a short link rotatably mounted on said bar adjacent each of said rollers, a roller carried by each of said links in the plane of the adjacent roller to form a set of guide rollers, a lateral guide flange on each of said carriage side walls, each of said flanges being slidably disposed between the rollers of one of said sets; means for halting upward movement of said carriage when it has reached its desired dumping position, said means including a stop switch mounted on said carriage in position to engage an element associated with said frame when said dumping position is reached and open an electrical circuit to said lift motor; means for automatically opening and closing the wing sections of said carriage when respectively approaching toward and departing from the down position of said carriage, said means comprising a pair of spaced mounting plates on each of said carriage side walls, each pair of plates having aligned openings to permit of slidably mounting a control rod therethrough, a hinge arm extending laterally from each wing section and terminating in substantial alignment with the openings in the associated mounting plates, a control rod passing through the aligned openings of each pair of plates and hingedly connecting at one end to the associated hinge arm, each of said rods being of sufficient length to engage said tank frame with said carriage in its down position and with said wing sections wide open, a fixed stop on each of said rods at an intermediate point between its mounting plates, and a spring under compression on each of said rods between such stop and that mounting plate closest to the hinge arm.

11. In combination a tank assembly involving a frame and a tank supported within said frame; means for emptying the contents of a container into said tank, said means including a carriage disposed adjacent an end of said tank assembly for holding a container to be emptied, said carriage involving a platform, side walls and an arcuate wall between said side walls, a plurality of heater units included with said arcuate wall, a pair of arcuate wing wall sections, each hingedly secured to an edge of one of said side walls and including a plurality of heater units, means for lifting said carriage to a dumping position with respect to said tank, said means including a pair of brackets on the adjacent end of said frame, a shaft journalled in said brackets, a pair of lift levers, each extending from said shaft and hingedly secured to said carriage adjacent the lower end thereof, a lift motor supported on said frame, and a chain and sprocket connection between said motor and said shaft to cause rotation of said shaft in response to energization of said lift motor and raise said carriage to an elevated position, means for simultaneously guiding the upper end of said carriage to a position over said tank and at the same time cause tilting of said carriage, said means including a bar mounted on said frame above and parallel to said shaft, a roller on and adjacent each end of said bar, a short link rotatably mounted on said bar adjacent each of said rollers, a roller carried by each of said links in the plane of the adjacent roller to form a set of guide rollers, a lateral guide flange on each of said carriage side walls, each of said flanges being slidably disposed between the rollers of one of said sets, means for halting upward movement of said carriage when it has reached its desired dumping position, said means including a stop switch mounted on said carriage in position to engage an element associated with said frame when said dumping position is reached, and open an electrical circuit to said lift motor; means for automatically opening and closing the wing sections of said carriage when respectively approaching toward and departing from the down position of said carriage, said means comprising a pair of spaced mounting plates on each of said carriage side walls, each pair of plates having aligned openings to permit of slidably mounting a control rod therethrough, a hinge arm extending laterally from each wing section and terminating in substantial alignment with the openings in the associated mounting plates, a control rod passing through the aligned openings of each pair of plates and hingedly connecting at one end to the associated hinge arm, each of said rods being of sufficient length to engage said tank frame with said carriage in its down position and with said wing sections wide open, a fixed stop on each of said rods at an intermediate point between its mounting plates, and a spring under compression on each of said rods between such stop and that mounting plate closest to the hinge arm.

12. In combination, a tank assembly involving a frame, a tank supported by said frame, means for emptying the contents of a container into said tank when such contents is of the nature of shortening or the like, said means including a carriage supportable in dumping position with respect to said tank assembly for holding a container to be emptied, heating means included in said carriage and adapted, when energized to heat the walls of a container held therein, and a heatable bar disposed across the discharge opening of a container when supported by said carriage in said dumping position.

References Cited in the file of this patent

UNITED STATES PATENTS

| | | |
|---|---|---|
| 1,583,643 | Ball | May 4, 1926 |
| 1,720,990 | Aeschbach | July 16, 1929 |
| 2,411,749 | Oberly | Nov. 26, 1946 |
| 2,413,900 | Abbott | Jan. 7, 1947 |
| 2,472,594 | Kuehn et al. | June 7, 1949 |
| 2,592,324 | Oliver | Apr. 8, 1952 |
| 2,599,560 | Ketterer | June 10, 1952 |
| 2,708,042 | McCallum | May 10, 1955 |

FOREIGN PATENTS

| | | |
|---|---|---|
| 769,551 | France | June 9, 1934 |